T. Z. CARPENTER.
GAGE.
APPLICATION FILED MAR. 26, 1919.
1,329,456.
Patented Feb. 3, 1920.
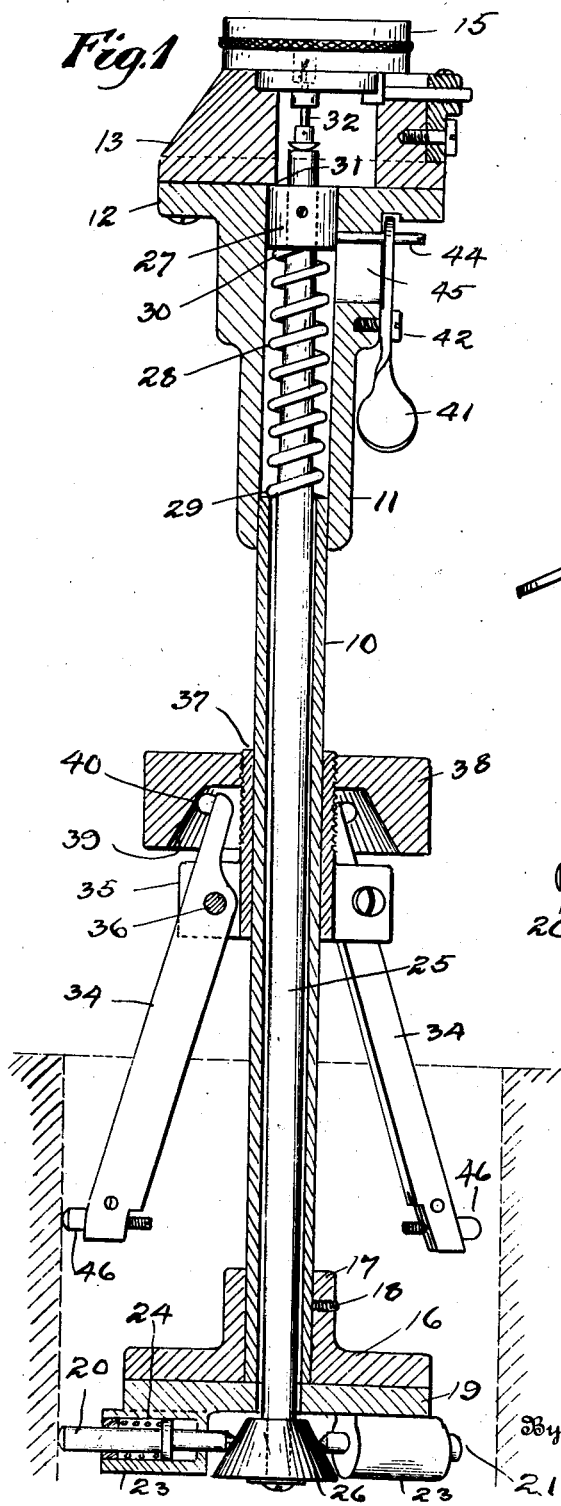
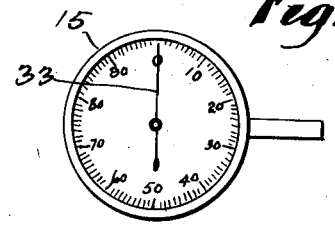
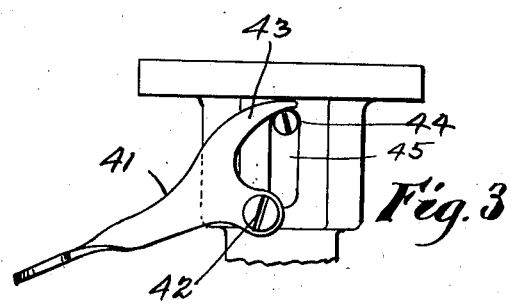
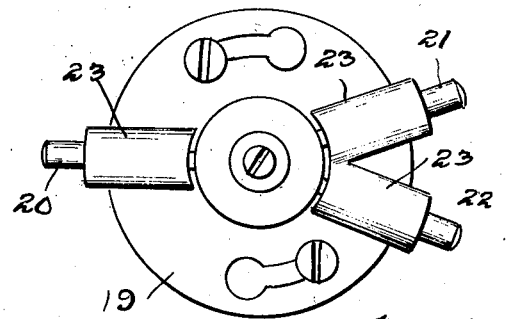
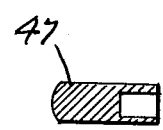
Inventor
Teunauski Z. Carpenter
By Howard E. Barlow
Attorney

UNITED STATES PATENT OFFICE.

TEUNAUSKI Z. CARPENTER, OF PROVIDENCE, RHODE ISLAND.

GAGE.

1,329,456.　　　　　Specification of Letters Patent.　　Patented Feb. 3, 1920.

Application filed March 26, 1919. Serial No. 285,221.

*To all whom it may concern:*

Be it known that I, TEUNAUSKI Z. CARPENTER, a citizen of the United States, and resident of the city of Providence, in the county of Providence and State of Rhode Island, have invented certain new and useful Improvements in Gages, of which the following is a specification.

This invention relates to gages more particularly designed for taking internal measurements of cylinders, and the object of the invention is to provide a simple, effective and improved gage adapted to be readily placed within the bore of a cylinder for the purpose of obtaining great delicacy and accuracy of measurement, to indicate whether or not the bore of the cylinder is out of true either diametrically or in the direction of its length.

A further object of the invention is to provide simple and effective means for accurately centering the device relative to the bore of the cylinder.

A still further object of the invention is to provide simple and effective means whereby the operating length of the feeler members of the device may be altered.

With these and other objects in view, the invention consists of certain novel features of construction, as will be more fully described, and particularly pointed out in the appended claims.

In the accompanying drawings:

Figure 1— is a sectional side elevation of my improved gage, showing the same as applied to a cylinder which is indicated in dotted lines.

Fig. 2— is a face view of the indicating member.

Fig. 3— is a view illustrating the lever for manually controlling the outward movement of the feeler members.

Fig. 4— is a view of the bottom of the gage, showing the relative positions of the feeler members and the means whereby the bottom plate and its feelers may be readily removed.

Fig. 5— is a detail showing the extension caps adapted to be fitted over the feeler members, and also over the pins in the centering arms for the purpose of increasing their effective operating length.

Referring to the drawings, 10 designates a tubular standard, on the upper end of which is fixed a head member 11 which is flanged at 12 and secured to the end portion 13 in which is mounted and fixed the indicator 15. Secured at the lower end of this standard by set screw 18 is boss 17 having a flange plate 16 and on the bottom of this flange plate 16 is secured another plate 19 on which latter plate is mounted the three feeler pins, fingers or members 20, 21 and 22, each of which is mounted in its respective boss 23 and normally pressed inwardly by means of springs 24 one of which is shown as acting upon the feeler 20.

Within this tubular standard 10 I have loosely mounted a long rod 25 to the lower end of which is secured a cone 26 against which the inner ends of the feelers press and near the upper end of this rod is secured a collar 27. A coil spring 28 having one end 29 engaging the upper end of the standard and its opposite end 30 engaging the under side of this collar 27, serves to normally force this rod upwardly and cause the cone 26 to press the feeler members outwardly against the action of their light springs 24.

The upward movement of this rod is limited by the collar 26 contacting with the overlapping edge 31 of the end member 13. The upper extremity of this rod engages the operating pin 32 on the indicator 15, said indicator being so arranged that the endwise movement of this pin causes the indicating hand 33 to rotate.

It is found in practice desirable in order to obtain a correct measurement of the work that the gage shall be supported centrally relative to the work being operated upon. Therefore to accomplish this in a simple and practical way I have shown one means by which this may be accomplished which is that of providing a plurality of arms 34 preferably three in number and pivotally mounting the same at 36 in a collar 35. This collar being provided with a threaded hub 37 on which is screwed a sleeve 38 tapered on its inner wall at 39. The upper end of each arm is provided with a knob or boss 40 bearing against this tapered portion whereby the relative adjustment of this sleeve 38 on the screw, causes the lower ends of these arms to swing either in or out to engage the inner wall of the cylinder and accurately centralize the instrument relative to the work.

I do not wish to be restricted to the particular design and construction of this centralizing member as the same may be made in a number of different ways to obtain substantially the same result.

In the operation of my improved gage when it is desired to insert the gage in the cylinder it is only necessary to press upwardly the operating lever 41 which is pivoted at 42 to cause its end 43 to engage the pin 44 extending outwardly from the collar 27, whereby this pin 44 moved downwardly in the slot 45 and through the rod 25, causes the cone 26 to be depressed permitting the feeler members to move inwardly and after the gage has been positioned in the cylinder, this operating handle is released and under action of spring 28 the rod and cone move upwardly and force the feelers outwardly to engage the cylinder walls.

The centralizing hub 37 is now slid downwardly along the standard until the arms 34 extend into the cylinder when the sleeve 38 is rotated on this hub to expand the arms and cause its button heads 46 to engage the inner wall of the cylinder and centralize the gage relative to the work. When it is desired to obtain the extent of out-of roundness of the cylinder the gage is rotated and any inaccuracy in the bore will be indicated by a movement of the fingers transmitted through the rod 25 to the indicator which will show the degree of inaccuracy of the work and in order to ascertain whether or not the cylinder has the same diameter of bore throughout its length the gage is slid up and down through the centralizing hub 37 and any inaccuracy due to an endwise movement of the feelers in the cylinder is noted on the indicator.

As it is necessary in practice that the end of the gage be centralized in the cylinder in order to obtain an accurate measurement, it is found advisable to place two of the feeler members 21 and 22 comparatively close together to work opposite the single radial feeler member 30.

In order to readily extend the length of these feeler members to operate upon cylinders of a greater diameter I have provided a set of small thimbles 47 which are adapted to slip over the ends of the feelers and also over the ends of the pins 46 to extend them to any desired length.

The foregoing description is directed solely toward the construction illustrated, but I desire it to be understood that I reserve the privilege of resorting to all the mechanical changes to which the device is susceptible, the invention being defined and limited only by the terms of the appended claims.

I claim:

1. A gage comprising a standard, a plurality of feeler members at one end of said standard, a spring-pressed rod in said standard, means whereby the endwise movement of said rod in one direction is limited by the outward movement of said feelers, an indicator at the upper end of said standard, and means whereby a movement of said rod controls the operation of said indicator.

2. A gage comprising a tubular standard, a plurality of feeler members at one end of said standard, a cone-shaped member against which said feelers rest with spring pressure, an endwise movable motion transmitting rod in said standard carrying at its lower end said cone-shaped member and controlled in its movement in one direction by said feelers, an indicator at the upper end of said standard, and means whereby the movement of said rod controls the operation of said indicator.

3. A gage comprising a standard, a plurality of laterally extending feeler members at one end of said standard, an indicator carried by said standard, a motion transmitting rod in said standard, means whereby the endwise movement of said rod controls the outward movement of said feelers and also controls the operation of said indicator, a spring for moving said rod to extend said feelers, and manually operable means for moving said rod to permit said feelers to move inward.

4. A gage comprising a standard, laterally extending feeler members on said standard, an indicator on said standard, a motion transmitting member carried by said standard for operating the indicator relative to position of said feelers, and adjustable means on said standard for engaging the inner wall of the work to be operated upon to centralize the standard relative thereto.

5. A gage comprising a standard, laterally extending feeler members on said standard, an indicator on said standard, a motion transmitting member carried by said standard for operating the indicator relative to the movement of said feelers, a plurality of movable arms mounted on said standard and means by which said arms may be adjusted along the standard to enter the cylinder, and means for expanding said arms to engage the inner wall of the cylinder to centralize the standard relative thereto.

6. A gage comprising a standard, laterally extending feeler members on said standard, an indicator on said standard, a motion transmitting member carried by said standard for operating the indicator relative to the movement of said feelers, a set of centralizing arms on said standard, means whereby the effective operating length of said feeler members may be readily altered, and means whereby the operating position of said arms may be adjusted on said standard.

In testimony whereof I affix my signature.

TEUNAUSKI Z. CARPENTER.